(12) United States Patent
Chevrel et al.

(10) Patent No.: US 8,551,438 B2
(45) Date of Patent: Oct. 8, 2013

(54) PRODUCTION OF SILANES BY ACID HYDROLYSIS OF ALLOYS OF SILICON AND OF ALKALINE-EARTH METALS OR ALKALINE-EARTH METAL SILICIDES

(75) Inventors: Henri Chevrel, Tokyo (JP); Dominique Belot, Le Chesnay (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 339 days.

(21) Appl. No.: 12/994,095

(22) PCT Filed: Apr. 21, 2009

(86) PCT No.: PCT/FR2009/050734
§ 371 (c)(1),
(2), (4) Date: Nov. 22, 2010

(87) PCT Pub. No.: WO2009/141540
PCT Pub. Date: Nov. 26, 2009

(65) Prior Publication Data
US 2011/0076220 A1    Mar. 31, 2011

(30) Foreign Application Priority Data
May 22, 2008  (FR) ...................................... 08 53321

(51) Int. Cl.
*C01B 33/04* (2006.01)

(52) U.S. Cl.
USPC .......................................... 423/347; 423/645

(58) Field of Classification Search
USPC .................. 423/347, 344, 644, 645; 422/608
See application file for complete search history.

(56) References Cited

U.S. PATENT DOCUMENTS

| 2,915,368 A | 12/1959 | Lorenz et al. |
| 4,698,218 A | 10/1987 | Belot et al. |

FOREIGN PATENT DOCUMENTS

| DE | 926 069 | 4/1955 |
| WO | WO 2006 041272 | 4/2006 |

OTHER PUBLICATIONS

Gmelin Handbook of Inorganic Chemistry, $8^{th}$ ed., 1982, Springer-Verlag, New York, pp. 59-62.
International Search Report and Written Opinion for corresponding PCT/FR2009/050734, Sep. 22, 2010.

*Primary Examiner* — Edward Johnson
(74) *Attorney, Agent, or Firm* — Allen E. White; Patricia E. McQueeney

(57) ABSTRACT

Method of preparing a compound of formula $Si_nH_{2n+2}$ in which n is an integer greater than or equal to 1 and less than or equal to 4, by reaction of at least one silicide or silicon alloy in the form of powder of formula $M^1_x M^2_y Si_z$, in which $M^1$ is a reducing metal, $M^2$ an alkali or alkaline-earth metal, x, y and z varying from 0 to 1, z being different from 0 and x+y different from 0, with an aqueous solution comprising $CO_2$, said solution is or is not saturated with $CO_2$ at the temperature and pressure of the reaction.

13 Claims, 1 Drawing Sheet

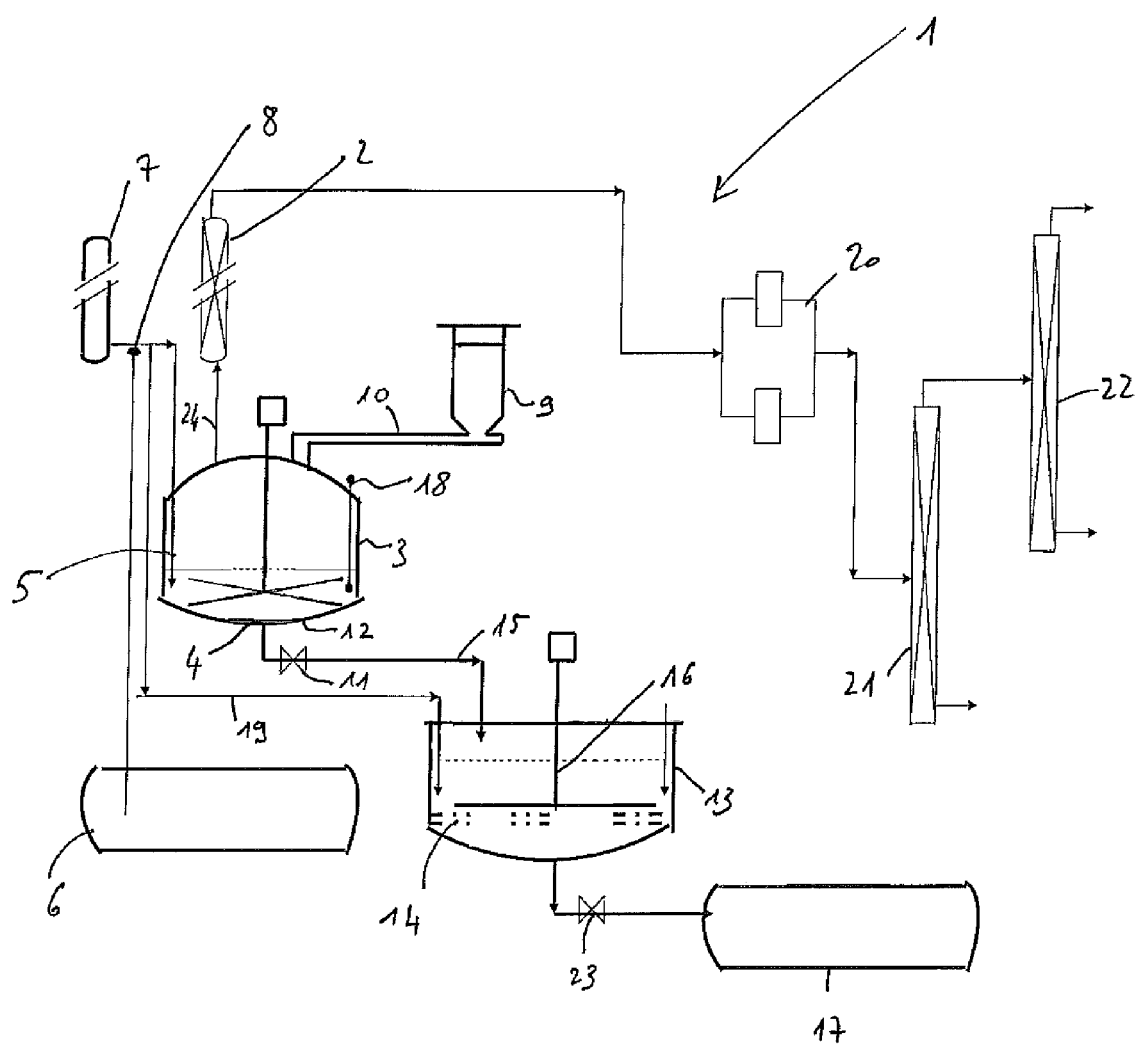

PRODUCTION OF SILANES BY ACID HYDROLYSIS OF ALLOYS OF SILICON AND OF ALKALINE-EARTH METALS OR ALKALINE-EARTH METAL SILICIDES

This application is a 371 of International PCT Application PCT/FR2009/050734, filed Apr. 21, 2009, the entire contents of which are incorporated herein by reference.

The present invention relates to the production of silicon hydrides or silanes by acid hydrolysis of silicon alloys or of silicides.

BACKGROUND

Some silanes and more particularly monosilane or silicon tetrahydride ($SiH_4$) are used as silicon vector in techniques for the deposition of amorphous silicon, of polycrystalline silicon, of nanocrystalline or microcrystalline silicon, also known as nano- or micro-morphous silicon, of silica, of silicon nitride or of another silicon compound, for example in vapor phase deposition techniques.

Depositions as a thin layer of amorphous silicon and monocrystalline silicon obtained from silane make it possible to manufacture solar cells.

It is also possible to obtain coatings resistant to corrosion by acids, by cracking of silane and manufacture of compounds such as silicon carbide.

Finally, the silane is capable of adding to single or multiple bonds of unsaturated hydrocarbons to give organosilanes.

The monosilane market will experience very strong expansion simultaneously in the manufacture of integrated semiconductors and the manufacture of thin-layer or crystalline solar (photovoltaic) cells, semiconductor components and the manufacture of flat screens.

Several types of processes described below have been used to date.

First of all, the reduction of $SiCl_4$ by $LiH$ in a KCl/LiCl bath at temperatures between 450° C. and 550° C. is known. The reaction yield is advantageous but the process is based, on the one hand, on the availability of $LiH$, whereas lithium resources are very limited, and, on the other hand, on the possibility of recycling the lithium metal by electrolysis. The reaction medium is highly corrosive and employs specific materials. This process has been used to produce small amounts of silane.

The reduction of $SiF_4$ by $NAlH_4$ in organic solvents medium is another example. This process is only viable industrially when there exists $SiF_4$, the byproduct of another chemical production, and sodium to manufacture the sodium aluminum hydride. This process cannot be easily used, in particular for these two reasons.

Another known reaction is the acid attack in a liquid $NH_3$ medium on a stoichiometric $SiMg_2$ alloy. The reaction balance is as follows:

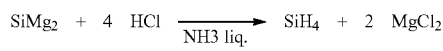

This process is carried out at a temperature close to ambient temperature at atmospheric pressure. This process is not satisfactory because of the difficulty of controlling the process and the use of liquid ammonia, which is subject to strict regulatory control.

Another known reaction is the dismutation of $SiHCl_3$ over boronate resins or other resins. The complete process is thus described:

a) $4Si_{Metal}+12HCl \rightarrow 4SiHCl_3+4H_2$ (temperature between approximately 800° C. and approximately 1100° C.)
b) $4SiHCl_3 \leftarrow \rightarrow SiH_4+3SiCl_4$ (ambient temperature)
$3SiCl_4+3H_2 \rightarrow 3SiHCl_3+3HCl$ (temperature of approximately 1000° C.),
i.e. the following reaction balance:

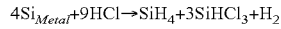

An alternative form of the above reaction is thus described:
a) $4Si_{Metal}+16HCl \rightarrow 4SiCl_4+8H_2$ (temperature of between approximately 1000° C. and approximately 1100° C.)
b) $4SiCl_4+4H_2 \rightarrow 4SiHCl_3+4HCl$ (temperature of approximately 1000° C.)
$4SiHCl_3 \rightarrow SiH_4+3SiCl_4$,
i.e. the following reaction balance:

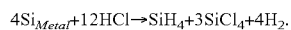

This process requires high temperatures in an extremely corrosive medium and consumes a great deal of energy (approximately 50 kWh/kg for stage b)). In order to achieve the maximum yield, stage b) requires numerous loops for recirculations of mixtures of chlorosilanes. Apart from the use of extremely corrosive, toxic and inflammable products, processes of such a type are very expensive in energy.

The generation of monosilane and higher silanes has been described in the Gmelin Handbook of Inorganic Chemistry, Si-Silicon, by reacting, in the aqueous phase, silicides and silicon alloys in an acidic or basic medium.

In patent applications EP 1 46 456 and WO2006/041272, a description is given of the synthesis of monosilane in the aqueous phase by dropping an $Al_xSi_yCa_z$ powder, x, y and z representing the respective percentages of aluminum, silicon and calcium, into an HCl solution. The composition of the gases produced was approximately 80% monosilane, 10% disilane and 5% trisilane, along with traces of disiloxane. This type of process exhibits the disadvantage of the handling and storage of pure or highly concentrated HCl. Byproducts resulting from such a reaction are produced in a large amount and are harmful to the environment. Another disadvantage of such a process is the copious formation of a foam in the reaction medium, which reduces the reaction yield and requires the presence of an antifoaming agent. Such a reaction is highly exothermic and temperatures of greater than 100° C. are fairly quickly achieved if the rate of introduction of the alloy powder is not greatly reduced.

None of these studies described above guarantees the conditions necessary for the achievement of a profitable process for industrial development.

SUMMARY

The invention includes both methods and apparatus to achieve the desired results, as described, but is not limited to the various embodiments disclosed.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 is a diagram of a plant used to carry out the disclosed process.

DESCRIPTION OF PREFERRED EMBODIMENTS

A simple process has been found which uses inexpensive starting materials and which produces silicon hydrides with an industrial yield and which does not exhibit all the disadvantages seen above.

One aim of the present invention is to overcome all or some of the disadvantages of the prior art noted above.

To this end, a subject matter of the invention is a process for the preparation of a compound of formula $Si_nH_{2n+2}$ in which n is an integer greater than or equal to 1 and less than or equal to 4, comprising a stage b) of reaction of at least one silicide or silicon alloy in the powder form of formula $M^1_xM^2_ySi_z$, in which $M^1$ is a reducing metal, $M^2$ is an alkali metal or alkaline earth metal and x, y and z vary from 0 to 1, z being other than 0 and the sum x+y being other than 0, with an aqueous solution comprising $CO_2$, said solution being or not being saturated with $CO_2$ at the temperature and pressure of the reaction.

Preferably, said aqueous solution is saturated with $CO_2$ at the temperature and at the pressure of the reaction.

A solution is saturated when the $CO_2$ introduced can no longer dissolve and forms a deposit.

By way of example, the weight of $CO_2$ which it is appropriate to add to said solution as a function of the temperature, at atmospheric pressure, in order to obtain a solution saturated with $CO_2$, is presented in table 1.

TABLE 1

| Temperature (° C.) | Weight (in g of $CO_2$ per liter of solution) |
|---|---|
| 0 | 3.3932 |
| 4 | 2.9135 |
| 8 | 2.5174 |
| 10 | 2.3501 |
| 12 | 2.1961 |
| 14 | 2.0597 |
| 16 | 1.9364 |
| 18 | 1.8220 |
| 20 | 1.7208 |
| 22 | 1.6284 |
| 24 | 1.5447 |
| 26 | 1.4655 |
| 28 | 1.3907 |
| 30 | 1.3203 |
| 40 | 1.0025 |
| 50 | 0.7352 |
| 60 | 0.5431 |
| 75 | 0.3646 |

The aqueous solution can comprise an acidic solution comprising an inorganic acid (for example, HCl, $H_2SO_4$ or $H_3PO_4$) or an organic acid, such as $CH_3COOH$, between 0.1N and 3N, saturated or not saturated with $CO_2$ at the temperature of the reaction.

The reducing metals are, for example, Al, B, Ga or In. The alkali metals are, for example, Li, Na, K or Cs. The alkaline earth metals are, for example, Mg, Ca, Sr or Ba.

Furthermore, embodiments of the invention can comprise one or more of the following characteristics:

$M^1$ is aluminum and $M^2$ is calcium or magnesium.

The silicon alloy comprises from 30% to 38% of aluminum, from 35% to 45% of silicon and from 15% to 25% of calcium, the percentages representing the percentages by weight of each element present in the alloy.

The silicon alloy is chosen from $Si_{0.5}Mg$, $Si_{0.5}Ca$, AlSiCa, CaSi, $Ca_{0.5}Si$, MgSi, AlSiNa, AlSiMg, SiNa, AlSiLi, SiK, $Ca_{0.5}AlSi_{0.33}$ and $Ca_{0.5}AlSi_{0.75}$, or a mixture of these, preferably $Si_{0.5}Mg$, AlSiNa, SiNa, $Si_{0.25}Li$, $Si_{0.25}Na$, $Si_{0.25}K$ or SiK. Other silicon alloys which are suitable for the present invention are the alloys of ferrosilicon type, for example FeSi, FeSiMg or FeSiCa.

Said aqueous solution comprising $CO_2$ is prepared by addition of $CO_2$ to water, the initial pH of which is between 6.5 and 7.5.

Said acidic solution is a mixture comprising $CO_2$ and at least one acid chosen from HCl, $H_2SO_4$, $H_3PO_4$ or $CH_3COOH$.

The particle size of the silicon alloy is between 0.2 mm and 0.9 mm and preferably between 0.2 mm and 0.5 mm.

The reaction is carried out at a temperature of between 0° C. and 100° C. at atmospheric pressure, preferably between 0° C. and 75° C. and more preferably between 0° C. and 50° C., at a pressure close to atmospheric pressure.

The reaction is carried out at a pH of less than 6, preferably between 4 and 6 and more preferably between 4.5 and 5. The pH of the reaction is thus not so low as when the acid employed during the hydrolysis is only a strong acid of the HCl, $H_2SO_4$ or $H_3PO_4$ type, for example. The reactions for which the pH is less than 4 are the reactions for which said aqueous solution comprises, in addition to the $CO_2$, at least one strong acid.

The process is characterized in that the reaction is carried out in the presence of at least one catalyst.

The process as defined above comprises the stages:
a) Injection of the aqueous solution comprising $CO_2$ and water into a reactor;
b) Introduction of the silicon alloy or silicide into said reactor;
c) Separation by settling and filtration of the byproducts obtained in stage b);
d) Condensation of the silanes in the liquid form or gas form under pressure;
e) Fractional distillation at approximately ambient pressure, intended to separate the monosilane from the higher silanes and traces of disiloxane which may be obtained in stage b);
f) Recovery of the pure monosilane.

The process is as described in claims 12 and 13.

The term "higher silanes" is understood to mean disilane, trisilane or tetrasilane.

The on-site unit for carrying out the process for the manufacture of silanes as defined above comprises:
at least one reactor equipped with means for introducing the silicon alloy (or silicide) as a powder and means for introducing the acidic solution;
a purification circuit comprising at least one reflux column which stops the steam, a demister, a fractionation column for separating the silanes and a double distillation column for recovering the pure monosilane;
at least one tank for separating by settling and filtering the liquid products.

The alloys or silicides employed in the implementation of the process according to the invention are alloys or silicides which are also used to control the foaming and the deoxygenation of the slags in steel foundries. These are low cost industrial products. One of the advantages of the process which is the subject matter of the invention is that of being able to carry out the reactions under conditions close to ambient conditions (temperature and pressure) in equipment standard in the inorganic chemical industry, such as reactors made of wired glass, for example. The processes employing these alloys or silicides can make it possible to produce the silane in units having small sizes as close as possible to the markets. Whatever the alloys and silicides available and the working and environmental constraints, the same unit can be used by adjusting the operating parameters.

In all cases, the byproducts are reusable inorganic products.

It has also been discovered that the particle size of the alloy powder has an effect on the reaction kinetics and consequently on the reaction yield. The kinetics increase when the size of the particles decreases. The formation of foams during the reaction constitutes the factor limiting the size of the particles. All conditions otherwise being equal, when the size of the particles is divided by 10, the amount of silane produced in the same time is multiplied by approximately 15.

In addition, the process according to the invention exhibits the advantage that, during the hydrolysis reaction, the foaming is greatly reduced and the reaction rate greatly accelerated in comparison with the reactions of the processes of the state of the art described above, which improves the quality of the manufacturing output of the silanes desired.

The process according to the invention also exhibits the advantage that the proportion of monosilane formed with respect to the silanes produced during the reaction is at least equal to 70%, which is important in view of the fact that the silane desired for the applications targeted by the present invention is above all the monosilane.

Furthermore, the use of $CO_2$ as acid for the hydrolysis carried out during the process according to the invention has the advantage, inter alia, that, for a pressure close to atmospheric pressure, the temperature of the reaction is of the same order of magnitude as ambient temperature, this being the case without, however, having to reduce the rate of introduction of the silicon alloy.

Another advantage of the process according to the invention is that the presence of hydrogen for producing precursors of silanes during the synthesis stage is not necessary.

Other distinctive features and advantages will become apparent on reading the following description, made with reference to FIG. 1.

FIG. 1 represents a diagram of a plant used to carry out the process according to the invention.

The production unit 1 comprises at least three parts comprising a reactor 3, a purification system and a tank 13 for separating by settling and filtering the liquid products.

The hydrolysis reaction for the production of silanes takes place in a reactor 3 equipped with a mixing means 4, such as a close-clearance impeller or a kneader, which makes it possible to mix the solid/liquid mass. The reactor is filled, on the one hand, by means of dip pipes 5 filled with water resulting from a water tank 6 and, on the other hand, with an acidic solution resulting from a system 7 for storage of the acidic solution. Said acidic solution can be $CO_2$ alone or as a mixture with other acids, such as $HCl$, $H_2SO_4$ or $H_3PO_4$, for example, the proportions of the mixture being chosen prior to the reaction by the user with the aim of obtaining the best possible yield in view of the problems to be solved identified above. In order to fill the reactor 3 with the water/acid mixture via the pipe 5, the water and the acidic solution are mixed using a mixer 8. The $CO_2$ alone can, for example, be run into the reactor in the liquid form from a liquid $CO_2$ tank. The reactor 3 can, for example, be integral with a lid, removable via the top, attached via U-bolts. Several dip pipes 5 are then also integral with the lid and are positioned so as to touch the wall of the reactor 3. The lid has a leaktight opening which makes it possible to connect a leaktight hopper 9. Preferably, the reactor is surrounded with a heat insulating cladding.

A means 9 for discharge of the silicon alloy is present in the vicinity of the reactor 3. Such a discharge means is, for example, a hopper 9 initially filled with a silicon alloy in the powder form of formula $M^1_xM^2_ySi_z$, in which $M^1$ is a reducing metal, $M^2$ is an alkali metal or alkaline earth metal and x, y and z vary from 0 to 1, z being other than 0. For example, the hopper 9 comprises an endless screw and a constricting hose 10, making it possible to isolate the hopper 9 from the reactor 3. The design of the hopper 9 is, for example, similar to the hoppers used to pour calcium carbide into the acetylene reactors. The alloy is conveyed in kegs similar to the kegs used to transport the calcium carbide in acetylene production units. The flow rate for injection of the acidic solution can be controlled by a pH probe 18.

According to a specific embodiment of the invention, two leaktight shutoff valves for gas and for isolation in series comprising, between the two, a side branch which makes it possible to purge the reactor 3 before disconnection are positioned above the lid of the reactor 3. An analogous device 11 equips the outlet at the bottom of the reactor 3 in order to discharge the liquids. The bottom of the reactor 3 is blocked off by means 12, for example a hatch, which prevents the liquid products from stagnating in the bottom channel. This hatch is raised by actuating the bottom valve 11.

The liquids are conveyed to a tank for separating by settling/filtering 13 via a pipe 15.

Air is kept excluded from the reaction region and, at the end of the reaction, the unreacted alloy is neutralized. The reaction region is purged with nitrogen or other inert gases, such as argon, and also all the ancillary parts of this region and the fractionation region (21, 22).

The tank 13 for separating by settling/filtering receives, by pressurizing the reactor 3 under an inert gas, the solution and the products in suspension at the end of the hydrolysis reaction which takes place in the reactor 3. This tank 13 has at least a working volume twice that of the reactor 3. The silanes emitted during the degassing in the tank are conveyed into the purification circuit described in detail below. Said tank 13 comprises, at the bottom of its height, a removable jacket 16 comprising a circular spider supporting a filtering agent 14.

In order to optimize the purification/filtration stage, a water/acid mixture resulting from the mixer 8 can be conveyed via a pipe 19 to the purification/filtration tank 13.

The clear waste solutions resulting from this purification/filtration stage are subsequently conveyed to a storage tank 17. These waste solutions exhibit the advantage of not being harmful to the environment and of being able to be recycled by virtue of the reaction of the process according to the invention.

In order to recover the desired silanes, the products resulting from the hydrolysis which are not conveyed to the tank 13 for separation by settling are directed to a purification system via a pipe 24. Said purification system comprises at least one reflux column 2 which stops the steam resulting from the hydrolysis reaction in the reactor 3. A demister is introduced at the outlet of said reflux column 2, which demister is intended to retain the water droplets which would be entrained in the atmosphere. Two receptacles for drying and neutralizing in parallel 20 are placed downstream of the demister. These two receptacles are filled with sodium aluminate. A fractionation column 21 is then present in order to separate the silanes and siloxanes present and, finally, a double distillation column 22 is used to recover the pure monosilane subsequently used for the desired applications.

EXAMPLES

Some nonlimiting examples of reaction schemes for reactions carried out according to the process of the invention are related below:

Example 1

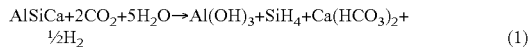

$$AlSiCa + 2CO_2 + 5H_2O \rightarrow Al(OH)_3 + SiH_4 + Ca(HCO_3)_2 + \tfrac{1}{2}H_2 \quad (1)$$

This reaction scheme is not described in the literature. By operating with a saturated $CO_2$ solution, it is possible to dissolve $Ca(OH)_2$ to give soluble calcium hydrogencarbonate, which can be easily converted to reusable calcium carbonate. Likewise, the presence of $CO_2$ tends to destroy the colloidal structure of the aluminum hydroxides and silica. These two factors promote a high reaction rate and a high yield.

Material balance (based on the reaction (1)): by assuming a 60% yield at least of silanes with respect to the silicon present
1 kg silanes (eg. $SiH_4$)
5 kg AlSiCa;
4.85 kg $CO_2$;
4.7 kg $H_2O$; this amount is very low in comparison with the weight necessary for the reactions of the state of the art (several $m^3$);
4.95 kg $Al(OH)_3$;
8.44 kg $Ca(HCO_3)_2 \rightarrow 14.74$ kg of easily recyclable byproducts;
1.25 kg of colloidal silica;
0.58 $m^3 H_2$.

This route introduces the advantage of only giving byproducts already existing in nature, of reusing the $CO_2$ emitted furthermore and of resulting in a "cake" of byproducts which can be more easily filtered and is more easily treated by the tank for separation by settling/filtering 13.

In the reaction scheme (1), a rise in temperature promotes the formation of the higher silanes. Thus, the reaction temperature close to ambient temperature by virtue of the use of $CO_2$ promotes the formation of monosilane.

The reaction can be carried out in water at neutral pH but the formation of calcium hydroxide, of colloidal aluminum and of colloidal silica interferes with the reaction as far as rendering the reaction rate very low.

Example 2

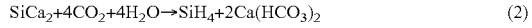

$$SiCa_2 + 4CO_2 + 4H_2O \rightarrow SiH_4 + 2Ca(HCO_3)_2 \quad (2)$$

The alloy used here is $SiCa_2$ but the result would be similar with the use of $SiMg_2$.

The silicide reacts spontaneously with the water at neutral pH but results in the formation of sparingly soluble $Ca(OH)_2$, reducing the reaction rate.

This reaction scheme is not described in the literature. By operating with a saturated $CO_2$ solution, it is possible to dissolve $Ca(OH)_2$ and thus to render the solution free to access the silicide and destroy the colloidal structure of the silicon hydroxide.

Material balance (based on the reaction (2)): by assuming a 60% yield at least of silanes with respect to the silicon present
1 kg silanes (eg. $SiH_4$
6.25 kg $SiCa_2$;
10 kg $CO_2$;
3.75 kg $H_2O$; this amount is very low in comparison with the weight necessary for the reactions of the state of the art (several $m^3$);
18.87 kg $Ca(HCO_3)_2$;
1.25 kg colloidal silica.

The advantage of this reaction scheme is of giving only colloidal silica as solid byproduct, of using $CO_2$ already emitted moreover and producing dissolved calcium bicarbonate which can be recycled to give calcium carbonate.

An example of a procedure to be followed for the implementation of a process according to the invention can be as described as follows.

1—Preparation of the Reactor:

At the end of the preceding reaction cycle, the reactor 3 is purged under inert gas, maintained under a slight excess pressure.

2—Introduction of the Alloy:

The particle size of the alloy is between 0.2 mm and 0.5 mm, giving a density of between 1.5 kg per liter and 2 kg per liter. Preferably, the alloy is introduced into the reactor 3 after the initial acidic solution has been introduced into the reactor 3.

The flow rate is determined by practical experience as a function of the foaming effect.

The amount of alloy is introduced by sequences in order for the level of solution to remain low to promote degassing.

3—Running the Reaction:

The reaction temperature is kept below 50° C. in order to promote the production of monosilane. The reactor 3 is filled with a volume of acidic solution resulting from the storage system 7 so that the low solution height promotes the degassing of the solution and minimizes the foaming effect. The alloy resulting from the hopper 9 is introduced steadily after having started the stirring of the reactor 3 by the stirrer 4. The injection of acid takes place simultaneously while keeping the pH at the chosen value.

When the $CO_2$ is used as sole acidic reactant, the $CO_2$ is injected directly into the solution and contributes a portion of the negative kilocalories necessary for the cooling of the reaction medium.

At the end of the sequence, the reactor 3 is kept stirred for a few minutes and then the liquid present in the reactor 3 is conveyed to the tank for separating by settling/filtering 13.

4—Separating by Settling/Filtering the Solution:

After each sequence, the solution and the products in suspension are transferred by gravity and slight excess pressure into the tank for separating by settling/filtering 13 stirred by virtue of the means 16. The solution is kept in the stirred tank 13 for a few minutes in order to complete the degassing and then the bottom valve 23 of the tank 13 is opened to start the filtration. The solution flows through the filtering agent 14. The solution comprises, according to the acid used, either $Ca(HCO_3)_2$, giving calcium carbonate by evaporation of the water, or $CaCl_2.6H_2O$, which can be recycled in the chemical or pharmaceutical field. The cake obtained on the filtering agent 14 is subsequently extracted from the tank 13. This cake comprises either alumina and silica, which gives a clay by calcination, or silica, which can be converted into silica gel.

In order to specify the orders of magnitudes, the conditions of a production unit 1 and the complete material balance are given below for the production of 100 T/year of monosilane using $CO_2$ as acidic reactant.

In the table which follows, 1 T=1000 kg.

Assumptions:
yield for conversion of silicon to silane: 60%;
production cycle 24 h;
total reaction time 15 h;

days of production: 330 days/year;
reactor size: diameter 2 m, working height: 1 m.

|  | AlSiCa | SiCa$_2$ |
|---|---|---|
| Amounts per year | 500 T | 625 T |
| Amounts per day | 1.51 T | 1.9 T |
| Hourly throughput | 100 kg | 125 kg |
| Amount of water per year (reaction) | 500 m$^3$ | 400 m$^3$ |
| Amount of water per day | 1.5 m$^3$ | 1.3 m$^3$ |
| Amount of CO$_2$ per year | 500 T | 1000 T |
| Amount of CO$_2$ per day | 1.51 T | 3 T |
| Hourly throughput of CO$_2$ | 100 kg | 200 kg |
| Solid residues per year | 1000 T | 1200 T |
| Solid residues per day | 3 T | 3.5% |
| Amount of silane per day | 300 kg | 300 kg |
| Hourly throughput of silane | 20 kg | 20 kg |

Whatever the silicide or alloy selected, the general conditions prevail:

the reaction can be carried out in water at neutral pH but the formation of hydroxides slows down the reaction rate. The addition of the acidic or basic solutions accelerates the reaction rate and the dissolution of a portion of the byproducts which slow down the reaction;

the reaction is vigorous in acidic solutions;

the reaction can also be carried out in a basic medium (pH 8 to 10) in order to dissolve a large portion of hydroxides;

the formation of the higher silanes is promoted by the rise in temperature;

an antifoaming agent based on silicones can be added to the solution in order to prevent the formation of foam which interferes with the reaction but the use of CO$_2$ as acidic solution reduces the need for such an antifoaming agent, in contract to the use of acids, such as HCl, for example.

Generally, the process according to the invention exhibits the following advantages in comparison with the processes of the state of the art described above:

The addition of CO$_2$ as acid promotes the precipitation and the flocculation of the byproducts, such as the aluminas, and this thus facilitates their filtration and then their treatment.

The weight of the byproducts, such as alumina and carbonate, is lower and there is thus less foam. The greater part of the reaction can thus take place in the reactor 3 and the yield is then significantly increased.

This technique according to the invention is less expensive than the processes employing chlorosilanes.

The energy consumption of the processes according to the state of the art is greater than 50 kWh per kilogram of monosilane produced, whereas, for the process according to the invention, this consumption is of the order of 10 kWh per kilogram of monosilane produced, at a temperature below 100° C.

As fast as CO$_2$ is consumed, it can be reinjected by flowing in the liquid form, so that the reaction takes place continuously, with a flow rate and a speed which are desired by the user.

The process according to the invention can be carried out with standard chemical equipment and in an identical production unit, whatever the alloys, silicides and acidic solutions of the reaction.

The reaction employed generates byproducts which can be recycled in chemical processes or everyday uses and which have a minor impact on the environment.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the preparation of a compound of formula Si$_n$H$_{2n+2}$ in which n is an integer greater than or equal to 1 and less than or equal to 4, the process comprising mixing CO$_2$ with water to produce an a aqueous solution comprising dissolved CO$_2$, reacting at least one silicide or silicon alloy in powder form and having a formula M$^1_x$M$^2_y$Si$_z$, in which M$^1$ is a reducing metal; M$^2$ is an alkali metal or alkaline earth metal; x, y, and z vary from 0 to 1; z being other than 0; and a sum of x+y being other than 0;

with the aqueous solution comprising dissolved CO$_2$, said solution being or not being saturated with CO$_2$ at a temperature and pressure of the reaction.

2. The process of claim 1, wherein said aqueous solution is saturated with CO$_2$ at a temperature and pressure of the reaction.

3. The process of claim 1, wherein M$^1$ is aluminum and M$^2$ is calcium or magnesium.

4. The process of claim 3, wherein the silicon alloy comprises, by weight of each element present in the alloy, from 30% to 38% of aluminum, from 35% to 45% of silicon and from 15% to 25% of calcium.

5. The process of claim 1, wherein the silicon alloy is chosen from FeSi, FeSiMg, FeSiCa, Si$_{0.5}$Mg, Si$_{0.5}$Ca, AlSiCa, CaSi, Ca$_{0.5}$Si, MgSi, AlSiNa, AlSiMg, SiNa, AlSiLi, SiK, Ca$_{0.5}$AlSi$_{0.33}$ and Ca$_{0.5}$AlSi$_{0.75}$, or a mixture of these.

6. The process of claim 1, wherein said aqueous solution is prepared by addition of CO$_2$ to water, an initial pH of which is between 6.5 and 7.5.

7. The process of claim 1, wherein said aqueous solution is an acidic mixture comprising CO$_2$ and at least one acid chosen from HCl, H$_2$SO$_4$, H$_3$PO$_4$, or CH$_3$COOH.

8. The process of claim 1, wherein a particle size of the silicon alloy is between 0.2 mm and 0.9 mm.

9. The process of claim 1, wherein the reacting step is carried out at a pressure close to atmospheric pressure.

10. The process of claim 1, wherein the reacting step is carried out at a temperature of between 0° C. and 75° C.

11. The process of claim 1, wherein the reacting step is carried out at a pH of less than 6.

12. The process of claim 1, comprising the stages:
a) mixing CO$_2$ with water to produce a mixture;
b) mixing the mixture resulting from stage a) and a silicon alloy;
c) separating by settling and filtering byproducts obtained in stage b); and
d) storing silanes by condensation in liquid or compressed gas form.

13. The process of claim 12, further comprising the stage of:
e) fractional distillation at close to ambient pressure intended to separate monosilanes from higher silanes and traces of disiloxane which may be obtained in stage b).

* * * * *